Feb. 27, 1934.  C. H. CAINE  1,948,506
BY-PASS CONDENSER
Filed Aug. 3, 1929
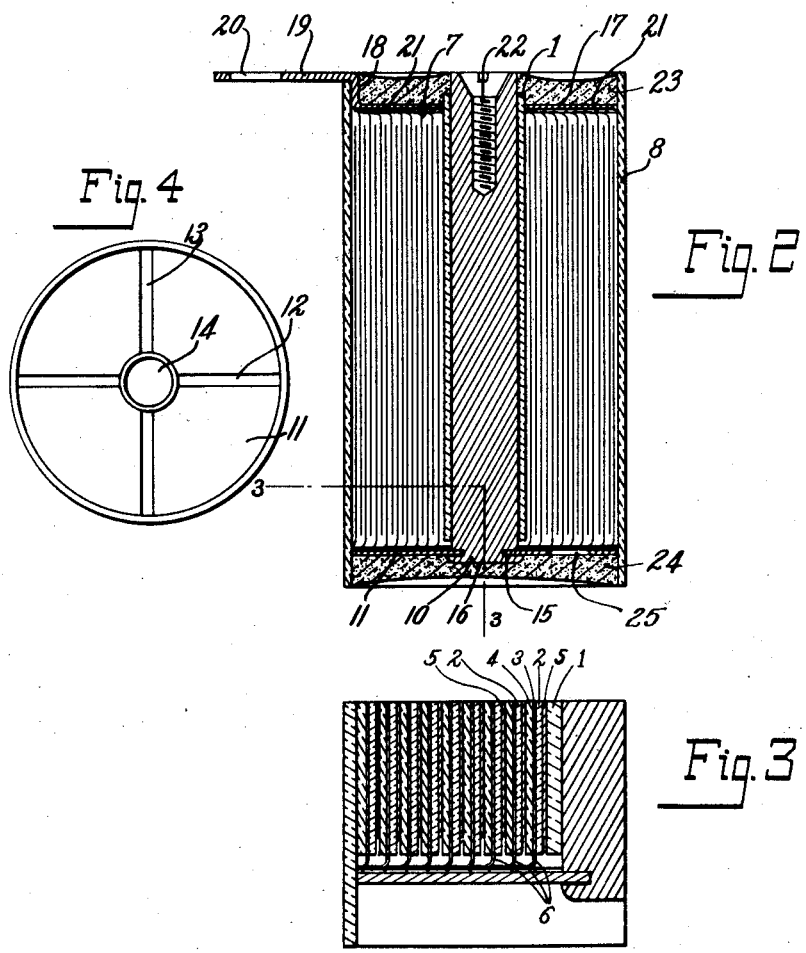

Patented Feb. 27, 1934

1,948,506

UNITED STATES PATENT OFFICE 1,948,506

BY-PASS CONDENSER

Charles H. Caine, Chicago, Ill., assignor, by mesne assignments, to Tung-Sol Lamp Works Inc. (Central Warehouse Division), a corporation of Delaware Application August 3, 1929. Serial No. 383,323

9 Claims. (Cl. 175—41)

This invention relates, in general, to condensers, more particularly to condensers of the type employed as by-pass condensers in radio sets and the like, and has for its principal object the production of a new and improved condenser of this type.

Condensers of this class are usually constructed of a pair of metal foils separated by an insulating material, such as paper, the combination of paper and foil being rolled to form the condenser. Terminals may be brought out in either one of two manners, the first being to provide a terminal strip adjacent one end of each foil, that strip projecting from the end of the roll to permit making contact with the foils which form the plates of the condenser. This type of condenser is generally known as the inductor type condenser.

The second method of making electrical connection to the plates of the condenser is by winding one of the foils so that it projects a short distance beyond one side of the insulating paper and winding the other foil so that it projects a short distance beyond the opposite side of the insulating paper. Contact to the foils is made by a suitable contacting strip attached to the end of the roll, this strip preferably being soldered in such a manner that it establishes electrical contact with each of the convolutions of the plate. This type of condenser is commonly known as the non-inductive type condenser.

The present invention relates to a condenser of the latter type, that is, a condenser in which the terminal plates are attached to opposite ends of the roll and are electrically connected to each convolution of the foil or plate.

In order to guard against the entrance of moisture into the insulating paper separating the plates of the condenser, and to impart to that paper a high dielectric characteristic, so that the condenser may thereby be improved, it is the common practice to impregnate the roll consisting of the insulating paper, or other suitable material and the metallic foils forming the plate of the condenser, in a bath of impregnating material such as paraffin, wax, or other similar substances. Frequently, this impregnation takes place under vacuum so that the moisture in the condenser is completely drawn out and the impregnating medium thereby made to penetrate entirely through the insulation of the condenser.

The condenser unit so constructed is usually encased in a casing of metal or other suitable material, such as a phenol condensation product to protect the condenser structure from mechanical injury and also to further guard against the entrance of moisture into the structure. The condenser structure may be sealed in a suitable can, this most usually being done by closing the opening of the can by a suitable sealing wax or asphaltum derivative.

The present invention provides a protective covering for the condenser which is wound over the structure winding and impregnated with a suitable waterproofing material. The open ends of the roll so formed are closed by sealing with a suitable filling compound, black filling wax preferably being used for this purpose, although other materials may be used. The protective covering so formed is made of paper, or fiber, to which the sealing compound firmly adheres, so that there is no danger of moisture penetrating the condenser through capillary action between the sealing compound and the protective covering.

In condensers manufactured heretofore, in which the condenser element was encased in a metallic can which was sealed by a compound, such as wax poured into the open end of the can, considerable trouble has been experienced due to moisture working its way through the seal along the inside face of the can. Because of the difference in the temperature coefficients of expansion between the filling material and the metallic can, this seal could never be maintained tightly against the inside surface of the can.

A condenser built in accordance with the teachings of my present invention eliminates this trouble and produces a condenser into which moisture cannot penetrate.

Now to acquaint those skilled in the art with the teachings of my invention, I have illustrated a preferred embodiment of it in the accompanying drawing, in which:—

Fig. 1 is an end view of a completely assembled condenser;

Fig. 2 is a cross-sectional view taken substantially along the line 2—2 of Fig. 1;

Fig. 3 is an enlarged detail view of a section of the condenser taken along the line 3—3 of Fig. 2; and Fig. 4 is a top view of the condenser before the terminals are inserted in place.

By reference to Figs. 1, 2 and 3, it will be seen that the condenser comprises a mandrel 1 around which are wound the insulating material and metallic foil which together comprise the plates and dielectric material of the condenser.

The metallic foils 3 and 5, which together comprise the plates of the condenser, are separated by insulating members 2 and 4, the member 2 being placed adjacent to the mandrel 1 and the member 4 between the plates 3 and 5. The metallic plates 3 and 5 may be tin-foil, aluminum foil, or any other suitable thin metal foil. The insulating members 2 and 4 may be a single thickness of paper, or several thicknesses of paper built up to the thickness required to properly space the plates 3 and 5 apart.

The plate 3 is disposed relative to the insulating member 2 so that the contacting edge 6 of this plate projects beyond the bottom edge of the insulator, as seen in Figs. 2 and 3, and the plate 5 is disposed so that its contacting edge 7 (Fig. 2) projects beyond the upper edge of the insulating member 4.

The insulators 2 and 4 and the foils 3 and 5 are wound on the mandrel 1 under considerable tension so that the assembly thus built up is solidly constructed and tightly wrapped around the core. The number of convolutions that these members make around the core depends upon the capacity that the condenser is to have, and after a sufficient number of turns have been placed the foils 3 and 5 are cut and a few extra turns of the papers 2 and 5 are placed on as a protection to the foil members.

A cover 8 is then wound around the assembly thus far built up. This cover consists of paper wound tightly over the condenser assembly, the winding continuing until a sufficient number of turns have been wound to build up the required thickness.

The assembly is then placed in a kick press and two grooves about $\frac{1}{32}$ inch deep are pressed into the edges 7 of the turns of foil. These grooves are indicated at 12 and 13 in Fig. 4. These grooves force the edges of the layers of the foil into contact with one another and further tend to expand the condenser into the cover 8. Similar depressions are made in the foil ends 6 at the bottom of the condenser.

This roll of paper and foil is baked and impregnated in the usual manner to drive out any moisture that may be in it and to guard against the entrance of more moisture. Wax or paraffin may be used as an impregnating medium and this may be applied by the usual vacuum method commonly used in the manufacture of so-called paper condensers.

The assembly so constructed comprises a cylindrical tube 8 having the mandrel 1 concentrically disposed within it with the condenser winding between this mandrel 1 and the cover 8. The terminal ends 6 of the plate 3 project outward beyond the insulators at one end of the condenser winding, and the terminal 7 of the plate 5 projects beyond the insulators at the opposite end of the condenser winding.

To finish the condenser and to establish electrical connection with its plates, I have provided the metallic core 10 which is arranged to snugly fit inside of the mandrel 1 of the condenser. Metallic core 10 is provided with a shoulder 15 against which the contacting washer 11 rests with the end of the core projecting through a central opening in that washer. The washer is held on the core by riveting or soldering over the end 16 of the core.

If desired, solder may be poured into the grooves 12 and 13 in the edges 6 of the condenser, and the core 10 inserted in the mandrel 1 with the contacting washer pressed down into the solder while the same is still in the molten condition. A few spaced openings 25 may be formed in the washer 11 to permit the escape of excess solder.

When the assembly has been permitted to cool, the plate ends 6 are firmly soldered to the contacting strip 11. If desired, the solder may, however, be entirely omitted. Preferably, the contacting strip and the core 10 are made of brass, and the base of the washer 11, adjacent the terminal end 6 of the condenser, is tinned prior to its assembly in the condenser structure.

Similarly, the opposite end of the condenser is closed and contact made with the projecting ends 7 of the plate 5 by a washer 17 which is similar to the washer 11, except that the central opening through it is sufficiently large to permit it to be slid on over the outside of the mandrel 1. The washer 17 is also provided with a depending ear 18 formed at right angles to the plane of the washer and having a terminal 19 projecting at right angles from this ear. An opening 20 in the outward end of this terminal 19 is provided to facilitate mounting the condenser. The washer 17 is assembled onto the condenser in the same manner as was the washer 11.

The core member 10 is provided with a central threaded opening 22 in the end adjacent the terminal 19. Electrical contact to the plates of the condenser is made by suitable connection to the core 10 through the threaded opening 22 and to the terminal 19 through the opening 20.

To finish the condenser and further guard against the entrance of moisture through it, the annular space within the cover 8 and outside of the core 10 is filled with a sealing 23 of wax or an asphaltum derivative which adheres firmly to the inside walls of the cover 8 and the outside surface of the washer 17. This seal is poured in while hot and allowed to cool.

Similarly, the opposite end of the condenser, around the head 16 of the core 10 and inside of the walls of the cover 8, is filled at 24 with a wax or an asphaltum derivative to seal that end of the condenser.

It will be apparent that the condenser so manufactured utilizes all of the space within the cover 8, and that there are no void or dead spaces within the condenser. The plates are tightly wrapped on the mandrel and the cover tightly wrapped on the plates so that the construction produces a condenser of high capacity for a given volume.

By suitable choice of the thickness of the insulators 2 and 4, the condenser can be built to operate on any voltage within the range of condensers of this type, and by suitable choice of the number of turns of foil wound on the core and of the widths of that foil, the capacity of the condenser can be varied within reasonable limits.

If desired, the capacitance of the condenser, or the voltage on which it is designed to work, or any other desired information can be stamped in the relatively soft wax which seals the ends of the condenser, thereby definitely identifying its characteristics. A steel stamp may be employed to make this marking.

While I have chosen to show my invention by illustrating a preferred embodiment of it, I am not to be limited to the specific details shown, as there are many modifications and adaptations which can be made by one skilled in the art without departing from the teachings of the invention.

Having thus described my invention, what I consider new and desire to have protected by Letters Patent is pointed out in the appended claims.

What is claimed is:—

1. In a condenser in which a pair of plates and a pair of separators therefor are rolled around a rigid cylindrical mandrel with one plate projecting from one end of the roll and bent over against that end and the other plate projected from the other end of the roll and bent over against that end, solder covering the bent over ends of said plates, and contact washers disposed in said solder, said washers having openings through which excess solder escapes as the washers are pressed into place while said solder is molten.

2. In a condenser in which a pair of plates and a pair of separators therefor are rolled around a rigid cylindrical mandrel with one plate projecting from one end of the roll and bent over against that end and the other plate projected from the other end of the roll and bent over against that end, solder covering the bent over ends of said plates, a protective cover formed of a plurality of layers of paper wrapped around said roll to hold it against radial expansion and projecting beyond the ends thereof to form cup-like pockets into which molten solder is poured, contact washers having openings through which the excess solder escapes as the washers are pressed through said molten solder into engagement with said plate ends, and terminal means attached to said washers and projecting beyond the end of said cover.

3. In a condenser in which a pair of plates and a pair of separators therefor are rolled around a rigid cylindrical mandrel with one plate projecting from one end of the roll and bent over against that end and the other plate projected from the other end of the roll and bent over against that end, solder covering the bent over ends of said plates, a protective cover consisting of a plurality of turns of fibrous material wrapped around said roll to hold it against radial expansion and projecting beyond the ends thereof to form cup-like pockets into which molten solder is poured, contact washers having openings through which the excess solder escapes as the washers are pressed through said molten solder into engagement with said plate ends, seals disposed in said cup-like pockets and engaging said washers and cover, and terminal means attached to said washers and projected beyond the end of said cover and seal.

4. In a condenser in which a pair of plates and a pair of separators therefor are rolled around a rigid cylindrical mandrel with one plate projecting from one end of the roll and bent over against that end and the other plate projected from the other end of the roll and bent over against that end, an insulating cover wrapped around said roll to hold it against radial expansion and projecting beyond the ends thereof to form cup-like pockets into which molten solder is poured, contact washers having openings through which the excess solder escapes as the washers are pressed through said molten solder into engagement with said plate ends, and terminal means attached to said washers and projected beyond the end of said cover.

5. A condenser comprising a mandrel, a pair of plates separated by a pair of insulators disposed in a winding making a plurality of tightly wrapped convolutions around said mandrel, a protective covering consisting of a plurality of layers of paper wrapped around said winding to hold it against radial expansion and projecting beyond the ends thereof, a core projected through said mandrel, a washer attached to one end of said core and disposed within said covering in engagement with one of said plates, a second washer disposed between said mandrel and cover and engaging the other of said plates, and sealing means disposed over said washers and engaging said cover to seal said condenser, said core and a terminal attached to said second washer projecting through said seal to form electrical terminals for said plates.

6. In a condenser, a rigid tube-like mandrel, a plurality of sheets of paper each rolled around said mandrel, a plurailty of times, the one end of said mandrel being flush with one edge of said roll and the other end projecting beyond the other edge of said roll, a pair of metallic foils disposed on opposite sides of one of said sheets of paper and rolled around said mandrel therewith, one of said foils projecting from one edge of said roll and the other from the opposite edge, contacting means engaging the end of one of said foils, said means including a core member extending through said mandrel, another contacting means engaging the end of said other foil, said means being separated from said core by the end of said mandrel projecting beyond said roll, an insulating cover around said roll for holding it against radial expansion, and sealing means engaging the ends of said cover and said contacting means to seal the ends of said roll.

7. A condenser comprising a hollow cylindrical mandrel around which are wound a pair of plate members separated by dielectrics, said plates making a plurality of convolutions around said mandrel, one of said plates projecting beyond one edge of the dielectric and the other plate beyond the opposite edge, a metallic core within said mandrel and projecting from both ends thereof, a contacting plate attached to said core and engaging the projecting end of one of said plates, a second contacting plate fitted around said mandrel and engaging the projecting end of the other plate, a terminal attached to said second contacting plate, mounting means in the end of said core adjacent said terminal and sealing means surrounding said winding and contacting plates.

8. In a condenser, inner convolutions of foil and paper, an outer protective covering surrounding said inner convolutions and impregnated with water proofing material, said covering extending beyond the ends of the convolutions of foil and paper, a terminal telescoping within the end of said cover and soldered to the convolutions of foil, said terminal having an outer end offset around the end of the covering, a central mandrel projecting axially into the extension of said covering and a seal substantially filling the annular space between the extending end of the covering and the end of the mandrel at the end of the inner convolutions of foil and paper.

9. In combination, a condenser having a metal core, alternate metal foils and layers of dielectric surrounding said core, a cover of insulating material surrounding the metal foils and layers of dielectric, said cover projecting endwise beyond the opposite ends of said foils and layers of dielectric, contacting pieces fitting into the opposite ends of the cover and in contact with the metal foils, a terminal in one end of said core, and insulating end pieces molded over the opposite ends of the core and closing the projecting ends of the cover, said terminal being exposed through one of said end pieces.

CHAS. H. CAINE.